United States Patent [19]
Senda et al.

[11] Patent Number: 5,733,986
[45] Date of Patent: Mar. 31, 1998

[54] RESIN COMPOSITION FOR AUTOMOBILE CONSTANT VELOCITY JOINT BOOT AND MOLDED AUTOMOBILE CONSTANT VELOCITY JOINT BOOT

[75] Inventors: Kazuhisa Senda; Yoshifumi Kojima, both of Fujisawa; Hiroshi Taguchi, Hannan; Kaoru Mori, Sakai; Kazunari Fukasawa, Izumiotsu, all of Japan

[73] Assignees: NOK Corporation; Dainippon Ink and Chemicals, Inc., both of Tokyo, Japan

[21] Appl. No.: 749,674

[22] Filed: Nov. 15, 1996

[30] Foreign Application Priority Data

Nov. 16, 1995 [JP] Japan .................. 7-298239
Sep. 27, 1996 [JP] Japan .................. 8-255718

[51] Int. Cl.$^6$ .................................. C08F 20/00
[52] U.S. Cl. .................. 525/440; 525/437; 525/438; 525/446; 524/261; 528/80; 528/83; 528/84
[58] Field of Search .................. 525/437, 438, 525/440, 446; 524/261; 528/80, 83, 84

[56] References Cited

U.S. PATENT DOCUMENTS

| | | |
|---|---|---|
| 4,374,177 | 2/1983 | Hsu et al. .................. 428/392 |
| 4,614,786 | 9/1986 | Goel et al. .................. 528/60 |
| 4,778,844 | 10/1988 | Blount .................. 524/706 |
| 4,778,861 | 10/1988 | Dervan et al. .................. 525/450 |
| 4,812,535 | 3/1989 | Dervan et al. .................. 525/450 |
| 5,281,472 | 1/1994 | Takahashi et al. .................. 428/336 |
| 5,330,820 | 7/1994 | Li et al. .................. 428/113 |
| 5,661,219 | 8/1997 | Nakane et al. .................. 525/166 |

*Primary Examiner*—Samuel A. Acquah
*Attorney, Agent, or Firm*—Armstrong, Westerman, Hattori, McLeland & Naughton

[57] ABSTRACT

A resin composition for automobile constant velocity joint boots having a surface hardness (Shore-D) of 34~44, and obtainable by melt mixing as essential components: 100 parts by weight of polyester elastomer (A); and, for every 100 parts by weight of said polyester elastomer (A), 0.05~7.0 parts by weight of organic polyisocyanate compound (B); and 0.1~5.0 parts by weight of silicone compound (C). A molded automobile constant velocity joint boot molded therefrom is superior in abrasion resistance, and flexibility.

14 Claims, 1 Drawing Sheet

1

RESIN COMPOSITION FOR AUTOMOBILE CONSTANT VELOCITY JOINT BOOT AND MOLDED AUTOMOBILE CONSTANT VELOCITY JOINT BOOT

BACKGROUND OF THE INVENTION

1. Field of the Invention

The present invention relates to a resin composition for an automobile constant velocity joint boot which is modified to a higher melt viscosity using a polyester elastomer (hereinafter abbreviated as TPEE), and which is superior in abrasion resistance, mechanical properties, and flexibility; and further relates to a molded automobile constant velocity joint boot molded from the above-mentioned resin composition.

2. Description of the Related Art

Automobile constant velocity joint boots are used in front and rear axles and while rotating, repeat a sliding motion, crossing of boundary bound and the like, and steering operations. For this reason, the bellows section repeatedly expands, contracts, and bends. The original function of this automobile constant velocity joint boot was the protection of the joint; and prevention of the penetration of water, dust, and the like from the outside; while maintaining the grease inside. The special characteristics demanded of the boot by the conditions of its operating environment are flexibility, flexural fatigue resistance, abrasion resistance, water resistance, tear resistance, low temperature resistance, weather resistance, grease resistance, etc.

Conventionally, in order to satisfy these characteristics, in general, rubber materials have been used. In particular, chloroprene rubber, which is superior in flexural fatigue resistance, and weather resistance, and has in combination a good balance of other characteristics, is used. However, when chloroprene rubber is used over a long period of time, breaks due to flying stones and ozone cracking, and the like often develop, and it has becoming difficult to respond to vehicle needs of recent years for improved reliability, longer life, higher velocities, and weight reduction.

From this type of situation, as a material to replace gum, consideration began of a TPEE which is light weight, has high rigidity, and, moreover, is superior in fatigue resistance, and low temperature resistance. As a result, TPEE automobile constant velocity joints are being adopted mainly in North America and Europe.

However, since conventional TPEE automobile constant velocity joint boots are stiffer than gum boots, there is the problem that their assembly in the manufacturing process is difficult. Reducing the stiffness of the TPEE automobile constant velocity joint boots was considered as a countermeasure to this; however, reducing the stiffness tends to lower durability (abrasion resistance), and up to the present it has not be possible to find a TPEE automobile joint boot with a surface hardness (Shore-D) of 45 or less which is superior in durability.

SUMMARY OF THE INVENTION

As a result of diligent research to achieve the above-mentioned objects, a thermoplastic resin composition, obtained by melt mixing TPEE (A); an organic polyisocyanate compound (B); a silicone compound (C) as essential components in specific proportions by weight, was discovered. This thermoplastic resin composition has a high melt viscosity, and specific hardness, and, moreover, is superior in abrasion resistance, and flexibility. In addition, the molded automobile constant velocity joint boot obtained by molding this thermoplastic resin composition into a predetermined shape is flexible, as a result, assembly during the manufacturing process is easy; and it is superior in durability, thereby completely achieving the present invention.

That is to say, the present invention relates to a resin composition for an automobile constant velocity joint boot and to a molded automobile constant velocity joint boot obtained using this resin composition. This resin composition has a surface hardness (Shore-D) of 34~44 and is obtained by melt mixing 100 parts by weight of polyester elastomer (A); and, for every 100 parts by weight of the above-mentioned polyester elastomer (A), 0.05~7.0 parts by weight of organic polyisocyanate compound (B); 0.1~5.0 parts by weight of silicone compound (C); 0.01~5.0 parts by weight of polyepoxy compound (D); and 0.01~3.0 parts by weight of lubricant (E). Furthermore, the present invention provides a resin composition for an automobile constant velocity joint, and a molded automobile constant velocity joint boot blow molded therefrom, which is superior in abrasion resistance, and flexibility, and which contains TPEE of specific hardness modified to a high melt viscosity.

DESCRIPTION OF THE PREFERRED EMBODIMENTS

Figure 1:
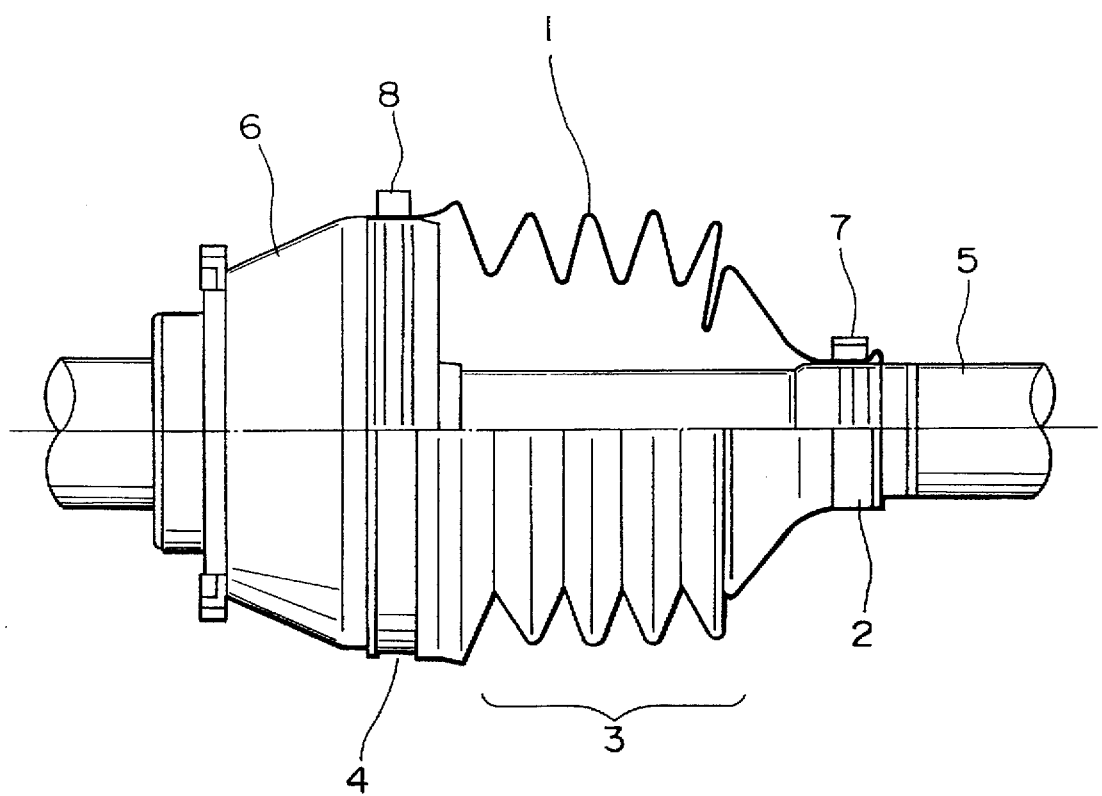
FIG. 1 is a cross sectional diagram of an example automobile constant velocity joint boot manufactured using the resin composition of the present invention.

The TPEE (A) of the present invention can use a known commonly used polyester elastomer. As this TPEE (A), for example, a product obtained by reaction of low molecular weight diol, dicarboxylic acid, aliphatic polyether and/or aliphatic polyester, or ester forming derivatives thereof as essential components can be used.

As the TPEE (A), an alkylene terephthalate type TPEE obtained by reacting alkylene glycol, terephthalic acid and/or the ester forming derivative thereof (for example, the alkylester of terephthalic acid), and poly(oxyalkylene) glycol, or their ester forming derivatives, is preferable; and tetramethylene terephthalate type TPEE is more preferable because it is particularly superior in the points of flexibility, and elastic recovery.

As TPEE (A), for example, a polyester elastomer having an impact resilience rate of 55~85% in accordance with JIS K-6301 measurement method is preferable.

In addition, as TPEE (A), in general, a substance with a surface hardness (Shore-D) of 30~50 can be used, but, in particular, a substance of 33~46 is preferable for flexibility.

In general, from the point of view of molecular structure, TPEE (A) comprises hard segments and soft segments. The hard segments are units comprising low molecular weight diols, dicarboxylic acids and/or alkylesters thereof; and the soft segments are units comprising aliphatic polyester and/or aliphatic polyester and carboxylic acids, and/or alkylesters thereof.

As the TPEE (A) of the present invention, the proportion of soft segments to hard segments within the molecular structure is preferably, when the former is divided by the later (ratio by weight), 40/60~75/25.

As the low molecular weight diol used to obtain the TPEE (A) of the present invention, for example, alkylene glycols such as ethylene glycol, propylene glycol, tetramethylene glycol, pentamethylene glycol, 2,2-dimethyl-trimethylene glycol, hexamethylene glycol, and decamethylene glycol; p-xylylene glycol, and cyclohexane dimethanol can be mentioned.

In addition, as the dicarboxylic acid and/or alkylester, for example, aromatic dicarboxylic acids such as terephthalic acid, isophthalic acid, 1,5-naphthalene dicarboxylic acid, 2,6-naphthalene dicarboxylic acid, diphenyl dicarboxylic acid, bis(p-carboxyphenyl)methane, and 4,4-sulfonyl dibenzoic acid; aliphatic dicarboxylic acid of 2~12 carbon atoms; or dialkylesters thereof can be mentioned.

In addition, as the aliphatic polyether and/or aliphatic polyester, for example, poly(oxyalkylene) glycols such as poly(oxyethylene) glycol, poly(oxypropylene) glycol, poly(oxytetramethylene) glycol; mixtures or copolymers of various of these poly(alkylene ether) glycols; poly-ε-caprolactone; polyesters obtained from aliphatic dicarboxylic acid of 2~12 carbon atoms, and aliphatic glycol of 2~10 carbon atoms, for example, polyethyleneadipate, polytetramethyleneadipate, polyethlenesebacate, polyneopentylsebacate, polytetramethylenedodecanate, polytetramethyleneacetate, polyhexamethyleneacetate, and the like; and, in addition, polyester polyether copolymers which are combinations of the above-mentioned aliphatic polyester and aliphatic polyether can be mentioned.

In order to obtain the TPEE (A) in the present invention, if necessary, as starting components, the use of small amounts of para-oxybenzoic acid, and para-(β-hydroxyethoxy)benzoic or the like as hydroxy acids is possible.

The TPEE (A) in the present invention can be obtained by known and commonly used condensation polymerizations, a representative TPEE can be manufactured, for example, by reacting terephthalic acid, or terephthalic acid dimenthyl, 1,4-butanediol, and poly(oxytetramethylene) glycol as essential components.

As the mole ratio, for every total 1 mole of said diol and glycol mixture, there are 0.7~1.5 moles of dicarboxylic acid or ester forming derivative thereof. The mole ratio of said diol and glycol is said diol/said glycol=97/3~55/45 (mole %), and preferably 95/5~60/40 (mole %).

In this case, it is possible for these to be simultaneously reacted, and it is possible for terephthalic acid or terephthalic acid dimethyl, and 1,4-butanediol to be reacted, thereby obtaining a prepolymer, which is then reacted with poly(oxytetramethylene) glycol.

In addition, as the TPEE (A), modified polyetherester block copolymer or modified polyesterester block copolymer can be used. The above-mentioned modified polyetherester block copolymer or the above-mentioned modified polyesterester block copolymer are obtained by reacting a hard segment form prepolymer adjusted in advance and a soft segment form prepolymer adjusted in advance with an organic polyisocyanate compound (B) mentioned below. The above-mentioned hard segment form prepolymer is obtained, for example, by reacting terephthalic acid, or the alkylester thereof, and 1,4-butanediol. In addition, the above-mentioned soft segment form prepolymer is obtained, for example, by reacting terephthalic acid, or the alkylester thereof, and poly(oxytetramethylene) glycol and/or aliphatic polyester.

TPEE (A) is preferably reacted with the organic polyisocyanate compound (B) mentioned below in order to increase the molecular weight, for this reason, the use of a TPEE which has active hydrogen atoms reactable with isocyanate groups is preferable. As active hydrogen atoms reactable with an isocyanate groups, for example, hydroxyl groups, carboxyl groups, and the like can be mentioned.

In the reaction for obtaining the above-mentioned TPEE, a TPEE having active hydrogen atoms reactable with isocyanate groups can be obtained by adjusting the functional group equivalent ratio (mole ratio) of carboxylic acid and hydroxyl group containing compound giving consideration to their reaction rate.

Theoretically, under reaction conditions of excess carboxyl groups, a TPEE having only carboxyl groups as active hydrogen atoms is obtained; however, under reaction conditions of excess hydroxyl groups, a TPEE having only hydroxyl groups as active hydrogen atoms is obtained; under reaction conditions where these carboxyl groups and hydroxyl groups are present in equivalent amounts, a TPEE having both carboxyl groups and hydroxyl groups as active hydrogen atoms is obtained. The presence of carboxyl groups and hydroxy groups can be understood by means of the acid number, and the hydroxyl group number, respectively.

The composition of the present invention is obtained by melt mixing TPEE (A), organic polyisocyanate compound (B), and silicone compound (C), as essential components; however, as generalizations, the following two Methods can be given.

Method (1): A situation in which only TPEE (A), organic polyisocyanate (B), and silicone compound (C) are melt mixed.

Method (2): A situation in which TPEE (A), organic polyisocyanate (B), silicone compound (C), polyepoxy compound (D), and lubricant (E) are melt mixed.

In either of the above-mentioned Methods (1) and (2), it is preferable to the select TPEE (A) so that it reacts well in the melt mixing. Moreover, in Method (1) above, as the TPEE (A),it is preferable to use a TPEE having active hydrogen atoms reactable with isocyanate groups; in Method (2) above, it is preferable to use a TPEE having at least one type of active hydrogen atoms reactable with isocyanate groups and/or epoxy groups. In particular, in Method (2); the use of a TPEE having two types of active hydrogen atoms reactable with epoxy groups, and active hydrogen atoms reactable with isocyanate groups is preferable.

In the above-mentioned Method (1), the TPEE (A) used is preferably a TPEE having at least hydroxyl groups, and, in addition to that, having a hydroxyl group number of 0.5~4.0 mg (KOH)/g. On the other hand, in Method (2) above, the TPEE (A) used is preferably a TPEE having both hydroxyl groups and carboxyl groups, and, in addition, having an acid number of 0.5~3.0 mg (KOH)/g, and a hydroxyl number of 0.5~4.0 mg (KOH)/g.

Since a TPEE having both hydroxyl groups and carboxyl groups can be used in either of the above two Method, it is particularly preferable. As a TPEE having both hydroxyl groups and carboxyl groups, a TPEE having an acid number of 0.5~3.0 mg (KOH)/g, and a hydroxyl group number of 0.5~4.0 mg (KOH)/g is preferable.

The organic polyisocyanate compound (B) used in the present invention is an aliphatic or aromatic compound having at least two or more isocyanate groups, and can be any of the known and commonly used compounds within this group. In addition, organic polyisocyanate compounds which have been masked can also be used.

As the organic polyisocyanate compound (B), any known and commonly used compounds can be used, for example, toluene-2,4-diisocyanate; 4-methoxy-1,3-phenylenediisocyanate; 4-isopropyl-1,3-phenylenediisocyanate; 4-chloro-1,3-phenylenediisocyanate; 4-butoxy-1,3-phenylenediisocyanate; 2,4-diisocyanatediphenylether; methylenediisocyanate; polymethylenepolyphenylenepolyisocyanate; 4,4-methylenebis(phenylisocyanate); 2,4-tolylenediisocyanate; 1,5-naphthalenediisocyanate; benzidinediisocyanate; 1,4-tetramethylenediisocyanate; 1,6-hexamethylenediisocyanate; 1,10-decamethylenediisocyanate; 1,4-cyclohexylenediisocyanate; xylilenediisocyanate; 4,4-methylenebis(cylcohexylisocyanate); and the like can be mentioned. Organic polyisocyanate compounds which have been masked are obtained by means of heat reacting the above-mentioned organic polyisocyanate compound with a masking agent in a solvent or under melting conditions. As a masking agent, there are alcohols, phenols, alkylphenols, ε-caprolactam, methylethylketooxine, and the like.

As the organic polyisocyanate compound (B) used when melt mixing, 4,4-methylenebis(phenylisocyanate) is preferable for its high thickening effects.

Within the range prescribed in the present invention, the greater the amount of organic polyisocyanate compound (B) used, the higher the melt viscosity becomes.

The silicone compound (C) used in the present invention is a silicone oil having a siloxane bond as a frame work, and various degrees of polymerization, and which can have various organic groups in side chains depending on the situation. As silicone compound (C), for example, silicone compounds represented by Molecular Structural Formula (1) can be mentioned.

Molecular Structural Formula (1)

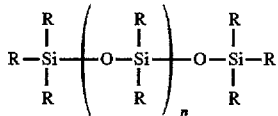

In the formula, R's represent a methyl group, a phenyl group, or a hydroxyl group and they can be the same or different, and n is an integer.

Specifically, the following can be given as examples of silicone compounds represented by the above-mentioned Molecular Structure Compound, dimethylsilicone oil is an equivalent of a compound in which all R's are methyl groups; penylmethylsilicone is an equivalent of a compound in which one part of the methyl groups is changed to a phenyl group; and methylhydrogensilicone oil is an equivalent of a compound in which one R is methyl, and another R is hydroxyl.

In the present invention, it is possible to use silicone oil of optional viscosity adjusted by the degree n of polymerization; however, within this, a dimethylsilicone oil having a viscosity of 1000~100,000 centistokes (cs) at 23° C. is suitable.

Within the range prescribed in the present invention, the greater the amount of silicone compound (C) used, the better abrasion resistance becomes.

In the present invention, at the time of modification by melt mixing, in contrast to the situation in which only organic polyisocyanate compound (B) and silicone compound (C) are used, when polyepoxy compound (D), and lubricant (E) are additionally used, it is possible for the obtained composition to have higher melt viscosity (higher molecular weight), and for moldability to be improved, and in addition, it is possible to obtain a new characteristic of additional low frictional noise properties in the composition.

The polyepoxy compound (D) used in the present invention is an epoxy compound having, within the same molecule, 2 or more epoxy groups; and the epoxy equivalent thereof is 100~4000, and preferably 300~3000. As representative compounds there are polyglycidylethers of multivalent phenols having a valency of 2 or greater represented by novolak type epoxy resins which are polyglycidylethers such as cresol novolak, and phenolnovolak, and bisphenol A type epoxy resins, which are diglycidylethers such as bisphenyl A, bisphenyl F, and halogenated bisphenyl A; polyglycidylethers of multivalent alcohols having a valency of 2 or greater such as ethylene glycol, propylene glycol, neopentyl glycol, 1,4 butanediol, and 1,6 hexanediol; polyglycidylethers of multivalent carboxylic acids having a valence of 2 or greater such as phthalic acid, isophthalic acid, and adipic acid; aminopolyepoxy compounds such as N,N,N',N'-tetraglycidylmetaxylenediamine, and N,N,N',N'-tetraglycidyl 1,3-bis(aminomethyl)cyclohexane. These epoxy compounds can be used singlely or 2 or more can be used together. Among polyepoxy compounds, bisphenol A type epoxy resin which is a diglycidylether of bisphenol A can be mentioned as preferable.

Within the range prescribed in the present invention, the greater the amount of polyepoxy compound (D) used, the higher the melt viscosity becomes.

As the lubricant (E) used in the present invention, for example, aliphatic hydrocarbon type lubricants such as liquid paraffins of C (carbon number) 16 or greater, microcrystalline waxes, natural paraffins, synthetic paraffins, polyolefin waxes, and partial oxides compounds thereof, or fluorides, and chlorides; C9 or greater high fatty acid type lubricants such as C16 or greater high aliphatic alcohols and oleic acids, lauric acid, stearic acid, and palmatic acid; amide and bisamide type lubricants of C9 or greater high fatty acids such as oleic acid, lauric acid, stearic acid, and palmitic acid; metallic soap type lubricants which are metal salts such as Ca, Zn, Mg, and Al of the C9 or greater high fatty acids mentioned above; fatty acid ester type lubricants such as high fatty acid esters of single valency alcohols, high fatty acid (part) ester of multivalent alcohols, long chain esters of montane wax type, or the products of the partial hydrolysis thereof, can be used. From among these Lubricants (E), amide or bisamide type lubricants of C9 or greater high fatty acids, such as oleic acid, lauric acid, stearic acid, and palmitic acid, can be mentioned as preferable.

Within the range prescribed in the present invention, the greater the amount of Lubricant (E) used, the greater the reduction in frictional noise generated by the rubbing of the surface of the constant velocity joint boot.

The resin composition for the automobile constant velocity joint boot of the present invention is obtained by melt mixing TPEE (A), organic polyisocyanante compound (B), and silicone compound (C) as essential components, and for the purpose of obtaining better moldability, melt viscosity is increased (molecular weight is increased), and when imparting low frictional sound properties, polyepoxy compound (D), and lubricant (E) are additionally added to the above in fixed proportions by weight.

In order to obtain the molded automobile constant velocity joint boot, the resin composition is manufactured in such a way that the impact resilience rate after the above-mentioned melt mixing is 60~80% irrespective of whether or not polyepoxy compound (D) and lubricant (E) were used.

In this melt mixing, the used TPEE (A) is thickened by means of increasing the molecular weight by reacting with organic polyisocyanate compound (B), and polyepoxy compound (D), which is used on accordance with need. The amounts of polyester elastomer (A), organic polyisocyanate compound (B), silicone compound (C), polyepoxy compound (D), and lubricant (E) are adjusted in such a way that the surface hardness of the finally obtained polyester elastomer resin composition is 34~44.

These used amounts are 100 parts by weight of polyester elastomer (A), and for every 100 parts by weight of polyester elastomer (A); 0.05~7.0 parts by weight, and preferably 0.10~5.0 parts by weight of organic polyisocyanate compound (B); 0.1~5.0 parts by weight, and preferably 0.3~4.0 parts by weight of silicone compound (C); 0.01~5.0 parts by weight, and preferably 0.05~3.0 parts by weight of polyepoxy compound (D); and 0.01~3.0 parts by weight, and preferably 0.05~2.0 parts by weight of lubricant (E). The composition is adjusted within these limits in such a way that the above mentioned impact resilience is in the above-mentioned range.

The mixing method is not particularly important, however, granular, powder, flake, liquid, etc. forms of (A)~(C) are melt mixed as essential ingredients. When compound (D), and lubricant (E) are not used, for example, the following methods can be used. 1) the above-mentioned (A)~(C) can be melt mixed simultaneously; and 2) TPEE (A) and a master batch of (B) and/or (C) prepared in advance, are melt mixed. When compound (D), and lubricant (E) are used, for example, the following methods can be used. 3) the above-mentioned (A)~(E) can be melt mixed simultaneously; and 4) TPEE (A), a master batch of (B) and/or (C) prepared in advance, and those materials not included in the master batch are melt mixed. Because the viscosity suddenly increases when these are mixed, a melt extrusion kneader, such as a common extruder can be used.

The temperature of the melt mixing and the time for the melt mixing are not particularly limited, and can be adjusted in accordance with melt mixing formulas and desired properties. In general, a temperature above that of the melting temperature of TPEE (A) is satisfactory, however, a temperature in the range from higher than the melting point of the crystals of the TPEE (A) to 260° C. is preferable. With regard to the period of the mixing, it should be conducted until the viscosity becomes saturated and uniform, however, it is usually of the level of 10 seconds to 120 minutes.

When the resin composition for automobile constant velocity joint boots of the present invention comprises only the above-mentioned (A)~(C) it has sufficiently superior characteristics, however, when components (D) and (E) are used in addition, the melt viscosity is further increased, moldability particularly by means of blow molding methods is improved, and low frictional noise properties are achieved. In addition, according to need, inorganic and/or organic fillers, and additives can be added. In this situation, for example, mold lubricants, coupling agents, coloring agents, heat resistant stabilizing agents, weather resistant stabilizing agents, foaming agents, rust preventing agents, flame retardants, hydrolysis preventing agents, fillers, strengthening agents, etc. can be added.

In addition, if necessary, other polyester elastomers, or thermoplastic resins other than these, for example, thermoplastic polyurethane resin, olefin type elastomers, sterene type elastomers, and polyamide type elastomers can be added within a range which does not damage the effects of the present invention.

The polyester elastomer resin composition, having a surface hardness of 34~44, obtained in the above-mentioned way can be used as a molded automobile constant velocity joint boot after being molded into the desired shape.

The molded automobile constant velocity joint boot of the present invention can be composed of simply the resin composition for automobile constant velocity joint boot of the present invention, or it can also be made by combining reinforcing materials such as plastic and metals with the above-mentioned resin compositon for automobile constant velocity joint boot of the present invention. In addition, the shape of the molded automobile constant velocity joint boot of the present invention is not particularly limited; however, a preferable shape is one which is capable of following rubbing, sliding, back and forth motion, and the like, and which can respond flexibly to changes in shape, such as a bellows shape or a bell shape.

FIG. 1 shows an example of a molded automobile constant velocity joint boot, in the Figure, 1 is a constant velocity joint boot, 2 is a small diameter ring section, 3 is a bellows section, 4 is a large diameter ring section, 5 is a shaft, 6 is a universal joint, 7 is a small diameter band, and 8 is a large diameter band.

The resin composition for automobile constant velocity joint boot of the present invention can be molded into the automobile constant velocity joint boot by any molding method, however, molding by means of blow molding in accordance with the above-mentioned shape is suitable. As this blow molding method, for example, a method can be mentioned in which the resin composition of the present invention, having a surface hardness of 34~44 when sufficiently dry, is plasticized in the heating cylinder of a blow molder and allowed to cool and solidify in a mold, thereby forming the predetermined molded article.

In general, for molding to proceed successfully, molding should be conducted under suitable conditions by appropriately selecting each of the conditions, for example, cylinder temperature, extrusion rate, parison thickness, blowing time, and mold temperature.

BEST MODE FOR CARRYING OUT THE INVENTION

In the following the best modes of the present invention are explained in detail.

100 parts of tetramethyleneterephthalate type TPEE (A), having both carboxyl groups and hydroxyl groups, a hydroxy group number of 0.5~4.0 mg (KOH)/g, an acid number of 0.5~3.0 (KOH)/g, an impact resilience rate of 55~80%, and obtained using poly(oxytetramethylene) glycol having the above-mentioned soft segment/hard segment (weight ratio) of from 40/60 to 75/25, a surface hardness (Shore-D) of 33~46, and an average molecular weight of 800~3000; 0.10~5.00 parts by weight of 4,4-methylenebis (phenylisocyanate); 0.3~4.0 parts by weight of dimethylsilicone oil of a viscosity of 5000~60,000 centistokes; 0.01~5.00 parts by weight of bisphenol A type epoxy resin of which the epoxy equivalent which is bisphenyl epoxy A diglycidylether is 100~5000; and 0.01~3.00 parts by weight of a bisamide compound were uniformly mixed in advance, and then melt mixed at 190°~250° C.

In this way, a resin composition for automobile constant velocity joint boots having an impact resilience rate of 60~80%, a surface hardness (Shore-D) in the range of 34~44, a melt viscosity at 230° C. of 7500~25000 poise, and a tensile strength of 18~30 Mpa is obtained.

A molded automobile constant velocity joint boot can be obtained by means of molding the above-mentioned resin composition in a blow molder under the conditions of a cylinder temperature of 210°~250° C., an extrusion rate of 5~15 mm/sec, a parison thickness of 2~5 mm, a blow time of 1~10 seconds, and a mold temperature of 20°~40° C.

The excellent molded article obtained in this way does not only have the superior flexibility, abrasion resistance, and low frictional noise properties as the effect of the present invention, but as secondary effects, it is superior in flexural fatigue resistance, water resistance, tear resistance, low temperature resistance, weather resistance, grease resistance, ozone resistance, and mechanical characteristics, and it is extremely good for practical application.

EXAMPLES

In the following, the present invention is explained in further detail using examples, and the melt viscosity, abrasion resistance, hardness, tensile strength, and tensile elongation were measured in accordance with the following. In the example, the expression "parts" indicates "parts by weight".

(1) Melt Viscosity

A pellet obtained by melt mixing is measured using a capillary rheometer.
Temperature: 230° C.
Die: 0.5 mm×5.0 mm (2) Hardness Shore-D is measured in accordance with ASTM D-2240. The measurement temperature was 23° C.

(3) Tensile Strength and Tensile Elongation

Measured in accordance with JIS K-6301. The measurement temperature was 23° C.

(4) Impact Resilience Rate

Measured in accordance with JIS K-6301. The measurement temperature was 23° C.

(5) Abrasion Resistance of Molded automobile constant velocity joint boot

After leaving a molded article, obtained using a blow molder, for 24 hours in an atmosphere of 40~50% humidity and a temperature of 25°±3° C., a functional evaluation test as an automobile constant velocity joint boot was conducted under the following conditions. The depth of abrasion of the article's surface (contact section) after 300 hours was measured.
Measurement Conditions
Revolutions: 600 rpm
Oscillation Angle: 25~40°
Oscillation Cycle: 30 cycle/minute
Temperature of Atmosphere: 23° C.

(6) Level of Frictional Noise for the Molded Automobile Constant Velocity joint Boot Evaluation of the amount of frictional noise produced by the molded article, obtained using a blow molder, rubbing against itself.
X: large frictional sound generated
◯: no generation of frictional noise Manufacturing Example of TPEE (A1)

After conducting an ester exchange reaction using 22.1 kg of terephthalic acid dimethyl, 10.8 kg of 1,4-butanediol, 27.5 kg of polyoxytetramethylene glycol (PTMG-1000) having a molecular weight of approximately 1000, and demethanolization; a condensation reaction was conducted for 3 hours at a temperature of 245° C. in the presence of tetrabutyltitanate (catalyst); and thereby TPEE was obtained. For this TPEE, the above-mentioned soft segment/hard segment (weight ratio)=62/38, and this TPEE has both carboxyl groups and hydroxyl groups, with a hydroxy group number of 1.97 mg (KOH)/g, and an acid number of 1.19 mg (KOH)/g.

The intrinsic viscosity, melt viscosity, surface hardness (Shore-D) of a molded sheet (2 mm thick) molded by means of injection molding, and impact resilience rate for the obtained TPEE pellet are shown in Table 1. Note that there is one measure for both hardness and flexibility.

TABLE 1

| TPEE | A1 |
| --- | --- |
| Intrinsic viscosity | 1.74 |
| Melt Viscosity (poise) | 2500 |
| Hardness (Shore-D) | 37 |
| Impact Resistance Rate(%) | 70 |

Examples 1~12

The obtained TPEE-A1, mentioned above, was uniformly premixed in the combinations shown in Table 2. After melt mixing (melt kneading) using a 40 mm diameter single extruder set at 240° C., a strand was pulled out, cooled, and pellets obtained by cutting using a pelletizer.

Molded articles for evaluation use are obtained by molding the these pellets in an in-line screw type injection molder with a cylinder temperature of 250° C., a mold temperature of 40° C., and a medium speed injection rate. The intrinsic viscosity, melt viscosity, surface hardness (Shore-D) of a molded sheet (2 mm thick) molded by means of injection molding, impact resilience rate, tensile strength, and tensile elongation for the obtained TPEE pellets were measured in the same way as described above and are shown in Table 2. These molded articles had excellent external luster.

In addition, abrasion resistance and the level of frictional noise were evaluated for molded automobile constant velocity joint boots molded using blow molding under the following conditions and using the same combinations shown in Table 2. In addition, the shape of the above-mentioned articles was as shown in FIG. 1.

Blow Molding Conditions

Extrusion Temperature: 220° C.
Extrusion Rate: 10 mm/second
Parison Thickness: 2~5 mm
Blowing Time: 1~10 seconds
Mold Temperature: 20°~40° C.

TABLE 2

| | EXAMPLE | | | | | |
| --- | --- | --- | --- | --- | --- | --- |
| | 1 | 2 | 3 | 4 | 5 | 6 |
| TPEE-A1 | 100 | 100 | 100 | 100 | 100 | 100 |
| MDI | 0.5 | 1.5 | 1.5 | 1.5 | | |
| TDI | | | | | 0.5 | 3.0 |
| Dimethylsilicone oil (30,000 centistokes) | 1.0 | 1.0 | 2.0 | | 1.0 | 1.0 |
| Phenylmethylsilicone oil (10,000 centistokes) | | | | 2.0 | | |
| Epoxy Resin | 0.5 | 1.5 | 1.5 | 2.0 | 3.0 | 0.2 |
| Ethylenebisstearic acid amide | 0.3 | 0.5 | 1.0 | 0.1 | 0.5 | 1.0 |

TABLE 2-continued

| PROPERTIES | | | | | | |
|---|---|---|---|---|---|---|
| Hardness (Shore-D) | 39 | 41 | 40 | 43 | 42 | 43 |
| Impact Resilience Rate (%) | 72 | 70 | 69 | 69 | 67 | 69 |
| Melt Viscosity (Poise) | 8300 | 15000 | 14600 | 17400 | 15400 | 24100 |
| Tensile Strength (MPa) | 26 | 28 | 25 | 26 | 21 | 25 |
| Tensile Elongation (%) | 580 | 640 | 680 | 610 | 520 | 500 |
| FUNCTIONAL EVALUATION OF AUTOMOBILE CONSTANT VELOCITY JOINT BOOT Abrasion Resistance | | | | | | |
| Abrasion Depth (mm) | <0.1 | <0.1 | <0.1 | <0.1 | <0.1 | <0.1 |
| Level of Frictional Noise | ⊚ | ⊚ | ⊚ | ⊚ | ⊚ | ⊚ |

| | EXAMPLE | | | | | |
|---|---|---|---|---|---|---|
| | 7 | 8 | 9 | 10 | 11 | 12 |
| TPEE-A1 | 100 | 100 | 100 | 100 | 100 | 100 |
| MDI | 0.6 | 1.5 | 1.5 | 1.5 | | |
| TDI | | | | | 0.6 | 3.0 |
| Dimethylsilicone oil (30,000 centistokes) | 1.0 | 1.0 | 2.0 | | 1.0 | 1.0 |
| Phenylmethylsilicone oil (10,000 centistokes) | | | | 2.0 | | |
| PROPERTIES | | | | | | |
| Hardness (Shore-D) | 41 | 44 | 42 | 42 | 39 | 43 |
| Impact Resilience Rate (%) | 72 | 71 | 69 | 68 | 70 | 69 |
| Melt Viscosity (Poise) | 8500 | 13000 | 13000 | 9000 | 11000 | 22000 |
| Tensile Strength (MPa) | 24 | 26 | 27 | 26 | 21 | 25 |
| Tensile Elongation (%) | 580 | 680 | 700 | 750 | 720 | 590 |
| FUNCTIONAL EVALUATION OF AUTOMOBILE CONSTANT VELOCITY JOINT BOOT Abrasion Resistance | | | | | | |
| Abrasion Depth (mm) | <0.1 | <0.1 | <0.1 | <0.1 | <0.1 | <0.1 |
| Level of Frictional Noise | X | X | X | X | X | X |

In Table 2 and Table 3, MDI is 4,4-methylenebis(phenylisocyanate); TDI is 2,4-tolylenediisocyanate; and epoxy resin is a diglycidylether of a bisphenol A having an epoxy equivalent of 2000 (also containing hydroxyl groups).

Comparative Example 1~2

The combinations of Table 3 were evaluated in the same way as for Examples 1~12.

These results are shown in Table 3.

TABLE 3

| | COMPARATIVE EXAMPLE | |
|---|---|---|
| | 1 | 2 |
| TPEE-A1 | 100 | 100 |
| MDI | 1.5 | |
| Dimethylsilicone oil (30,000 centistokes) | | 2.0 |
| PROPERTIES | | |
| Hardness (Shore-D) | 40 | 34 |
| Impact Resilience Rate (%) | 70 | 68 |
| Melt Viscosity (Poise) | 13000 | 2100 |
| Tensile Strength (MPa) | 26 | 20 |
| Tensile Elongation (%) | 680 | 600 |
| FUNCTIONAL EVALUATION OF AUTOMOBILE CONSTANT VELOCITY JOINT BOOT Abrasion Resistance | | |
| Abrasion Depth (mm) | 0.6 | 0.3 |
| Level of Frictional Noise | X | X |

As can be understood from comparison of Example 9 and Comparative Examples 1~2, the abrasion resistance of the joint boots obtained from the compositions of the Examples are particularly remarkable and unexpected from each of the joint boots obtained from each of the compositions using conventional TPEE melt mixed with only a silicone compound or only an organic polyisocyanate.

As can be understood form a comparison of Example 2 and Example 8, Example 2, which was melt mixed using polyepoxy compound and a lubricant in addition, has higher viscosity, and reduced frictional noise when compared with Example 8, which was melt mixed without using the polyepoxy compound and lubricant. The automobile constant velocity joint boot obtained by melt mixing using the organic polyisocyanate compound, silicone compound, polyepoxy compound, and lubricant of Example 2 has excellent flexibility, abrasion resistance, and low frictional noise properties, and in addition to having an extremely easy assembly during the manufacturing process, since it is also superior in durability when in practical use after assembly, the frequency of replacement is also reduced.

The resin composition for automobile constant velocity joint boot of the present invention is a resin composition having a specific hardness range and obtained by modifying TPEE (A) using a specific amount of organic polyisocyanate compound (B), while adding a specific amount of silicone compound (C), and as a result, this resin composition exhibits the particular remarkable combined effects of flexibility and abrasion resistance.

The resin composition for automobile constant velocity joint boot of the present invention is a resin composition having a specific hardness range and obtained by modifying TPEE (A) using specific amounts of organic polyisocyanate compound (B) and polyepoxy compound (D), while adding specific amounts of silicone compound (C) and lubricant (E) together, and as a result, this resin composition exhibits the particular remarkable combined effects of superior moldability, flexibility, abrasion resistance, and low frictional noise properties.

Furthermore, the molded automobile constant velocity joint boot obtained by blow molding the composition recited in claim 1 exhibits the particularly remarkable effects that, due to having the above-mentioned excellent flexibility, it is possible to assemble extremely easily and in shorter time the joint section during the automobile manufacturing process, which is difficult with a hard automobile constant velocity joint boot; and in addition, due to having the above-mentioned excellent abrasion resistance, it is possible to increase durability for practical use after assembly, and to reduce the frequency of replacement due to abrasion. In addition to the technical effects of the molded automobile constant velocity joint boot obtained using the composition of claim 1, the molded automobile constant velocity joint boot obtained by blow molding the composition recited in claim 3 exhibits the particularly remarkable combined effects of excellent moldability, and new low frictional noise properties.

What is claimed is:

1. A resin composition for automobile constant velocity joint boots, said resin composition having a surface hardness (Shore-D) of 34~44, and obtainable by melt mixing as essential components:

100 parts by weight of polyester elastomer (A); and, for every 100 parts by weight of said polyester elastomer (A), 0.05~7.0 parts by weight of organic polyisocyanate compound (B); and 0.1~5.0 parts by weight of silicone compound (C).

2. A resin composition for automobile constant velocity joint boots according to claim 1, wherein said polyester elastomer (A) is a polyester elastomer containing an active hydrogen atom reactable with an isocyanate group.

3. A resin composition for automobile constant velocity joint boots, said resin composition having a surface hardness (Shore-D) of 34~44, and obtainable by melt mixing:

100 parts by weight of polyester elastomer (A); and for every 100 parts by weight of said polyester elastomer (A), 0.05~7.0 parts by weight of organic polyisocyanate compound (B);

0.1~5.0 parts by weight of silicone compound (C);

0.01~5.0 parts by weight of polyepoxy compound (D); and 0.01~3.0 parts by weight of lubricant (E).

4. A resin composition for automobile constant velocity joint boots according to claim 3, wherein said polyester elastomer (A) is a polyester elastomer containing active hydrogen atoms reactable with isocyanate groups and/or epoxy groups.

5. A resin composition for automobile constant velocity joint boots according to claim 1 or claim 3, wherein said polyester elastomer (A) is a polyester elastomer having an impact resilience rate of 55~85%.

6. A resin composition for automobile constant velocity joint boots according to claim 1 or claim 3, wherein said polyester elastomer (A) is a polyester elastomer obtained by reacting terephthalic acid or an ester forming derivative thereof with 1,4-butanediol and poly(oxytetramethylene) glycol as essential components.

7. A resin composition for automobile constant velocity joint boots according to claim 1 or claim 3, wherein an impact resilience rate of said composition obtained by melt mixing is 60~80%.

8. A resin composition for automobile constant velocity joint boots according to claim 1 or claim 3, wherein a surface hardness (Shore-D) of said polyester elastomer (A) is 30~50.

9. A resin composition for automobile constant velocity joint boots according to claim 1 or claim 3, wherein said organic polyisocyanate compound (B) is 4,4-methylenebis (phenylisocyanate).

10. A resin composition for automobile constant velocity joint boots according to claim 1 or claim 3, wherein said silicone compound (C) is dimethylsilicone oil.

11. A resin composition for automobile constant velocity joint boots according to claim 3, wherein said polyepoxy compound (D) is bisphenol A type epoxy resin.

12. A resin composition for automobile constant velocity joint boots according to claim 3, wherein said lubricant (E) is an amide or a bisamide type compound.

13. A molded automobile constant velocity joint boot molded from a resin composition having a surface hardness (Shore-D) of 34~44, and obtainable by melt mixing as essential components:

100 parts by weight of polyester elastomer (A); and for every 100 parts by weight of said polyester elastomer (A), 0.05~7.0 parts by weight of organic polyisocyanate compound (B); and 0.1~5.0 parts by weight of silicone compound (C).

14. A molded automobile constant velocity joint boot molded from a resin composition having a surface hardness (Shore-D) of 34~44 and obtained by melt mixing:

100 parts by weight of polyester elastomer (A); and for every 100 parts by weight of said polyester elastomer (A), 0.05~7.0 parts by weight of organic polyisocyanate compound (B);

0.1~5.0 parts by weight of silicone compound (C);

0.01~5.0 parts by weight of polyepoxy compound (D); and 0.01~3.0 parts by weight of lubricant (E).

* * * * *